(12) United States Patent
Conway et al.

(10) Patent No.: US 6,754,776 B2
(45) Date of Patent: Jun. 22, 2004

(54) METHOD AND SYSTEM FOR LOGICAL PARTITIONING OF CACHE MEMORY STRUCTURES IN A PARTITONED COMPUTER SYSTEM

(75) Inventors: Patrick N. Conway, Los Altos, CA (US); Kazunori Masuyama, San Jose, CA (US); Takeshi Shimizu, San Jose, CA (US); Toshio Ogawa, San Jose, CA (US); Martin Sodos, San Jose, CA (US); Sudheer Miryala, San Jose, CA (US); Jeremy Farrell, Campbell, CA (US)

(73) Assignee: Fujitsu Limited, Kawasaki (JP)

( * ) Notice: Subject to any disclaimer, the term of this patent is extended or adjusted under 35 U.S.C. 154(b) by 388 days.

(21) Appl. No.: 09/861,258

(22) Filed: May 17, 2001

(65) Prior Publication Data

US 2002/0174301 A1 Nov. 21, 2002

(51) Int. Cl.[7] ............................................... G06F 12/00
(52) U.S. Cl. ........................ 711/129; 711/3; 711/128; 711/153; 711/173
(58) Field of Search ............................ 711/3, 128, 129, 711/153, 173

(56) References Cited

U.S. PATENT DOCUMENTS

| | | |
|---|---|---|
| 5,175,839 A | 12/1992 | Ikeda et al. |
| 5,465,338 A | 11/1995 | Clay |
| 5,561,780 A | 10/1996 | Glew et al. |

(List continued on next page.)

OTHER PUBLICATIONS

Abandah, Gheith A., et al. *Effects of Architectural and Technological Advances on the HP/Convex Exemplar's Memory and Communication Performance*, 1998 25th International Symposium on Computer Architecture, pp. 318–329;.

Falsafi, Babak et al., *Reaactive NUMA: A design for Unifying S–COMA and CC–NUMA* , 1997 24th International Symposium on Computer Architecture, pp. 229–240.

Geralds, John in Silcon Valley. Sun enhances partitioning in Starfire Unix server. Dec. 08, 1999. VNU Business Publishing Limited [retrieved on 2001–04–11]. Retrieved from the internet: *URL:http//www.vnunet.com/print/104311.*

IBM. The IBM NUMA–Q enterprise server architecture. *Solving issues of latency and scalability in multiprocessor sytems.* Jan. 19, 2000, 10 pages.

Lovett, Tom et al., *StinNG: A CC–NUMA Computer System for the Commercial Marketplace*, 1996 23[23]International Symposium on Computer Architecture, pp. 308–317.

Servers White Paper. *Sun Enterprise ™1000 Server: Dynamic System Domains* . Sun Microsystems, Inc., Palo Alto, CA, USA. 2001. [retrieved on 2001–04–11]. Retrieved from the internet: *URL:http://www.sun.com./servers/white–papers/domains.html?pagestyle=print.*

Unisys White Paper. *Cellular Multiprocessing Shared Memory: Shared Memory and Windows*, Sep. 2000, pp. 1–16.

Willard, Christopher,an IDC White Paper. *Superdome–Hewelett–Packard Extends Its High–End Computing Capabilities*, (2000), pp. 1–20.

*Primary Examiner*—Donald Sparks
*Assistant Examiner*—Bao Q Truong
(74) *Attorney, Agent, or Firm*—Fenwick & West LLP (57) ABSTRACT

A system and method of logically partitioning shared memory structures between computer domains is disclosed. In one embodiment, each domain is assigned a unique address space identifier. The unique address space identifier preferably has tag extension and index extension bits. This permits the tag and index bits of a conventional local domain address to be extended with tag extension and index extension bits. Data entries in the shared memory structure may be accessed using an extended index value. Hits may be determined using an extended tag value.

27 Claims, 7 Drawing Sheets

U.S. PATENT DOCUMENTS

| | | | |
|---|---|---|---|
| 5,829,032 A | 10/1998 | Komuro et al. | |
| 5,859,985 A | 1/1999 | Gormley et al. | |
| 5,887,134 A | 3/1999 | Ebrahim | |
| 6,006,255 A | 12/1999 | Hoover et al. | |
| 6,014,690 A | 1/2000 | VanDoren et al. | |
| 6,026,472 A | 2/2000 | James et al. | |
| 6,192,458 B1 * | 2/2001 | Arimilli et al. | 711/220 |
| 6,493,800 B1 * | 12/2002 | Blumrich | 711/129 |
| 6,493,812 B1 * | 12/2002 | Lyon | 711/207 |
| 2002/0184345 A1 | 12/2002 | Masuyama et al. | |
| 2002/0186711 A1 | 12/2002 | Masuyama et al. | |
| 2003/0005070 A1 | 1/2003 | Naraimhamurthy et al. | |
| 2003/0005156 A1 | 1/2003 | Miryala et al. | |
| 2003/0007457 A1 | 1/2003 | Farrel et al. | |
| 2003/0007493 A1 | 1/2003 | Oi et al. | |
| 2003/0023666 A1 | 1/2003 | Conway et al. | |
| 5,592,671 A | 1/1997 | Hirayama | |
| 5,727,150 A | 3/1998 | Laudon et al. | |
| 5,761,460 A | 6/1998 | Santos et al. | |
| 5,809,535 A * | 9/1998 | Tanioka | 711/144 |

* cited by examiner

METHOD AND SYSTEM FOR LOGICAL PARTITIONING OF CACHE MEMORY STRUCTURES IN A PARTITONED COMPUTER SYSTEM

BACKGROUND OF THE INVENTION

1. Field of the Invention

The present invention relates generally to the logical partitioning of a shared memory structure of a computer system. More particularly, the present invention is directed towards logical partitioning a cache memory between computer domains.

2. Description of Background Art

Multinode computer networks are often partitioned into domains, with each domain functioning as an independent machine with its own address space. An operating system runs separately on each domain. Partitioning permits the resources of a computer network to be efficiently allocated to different tasks, to provide flexibility in the use of a computer system, and to provide isolation between computer resources to limit the effects of hardware or software faults in one part of the network from interfering with the operation of the entire system.

Figure 1:
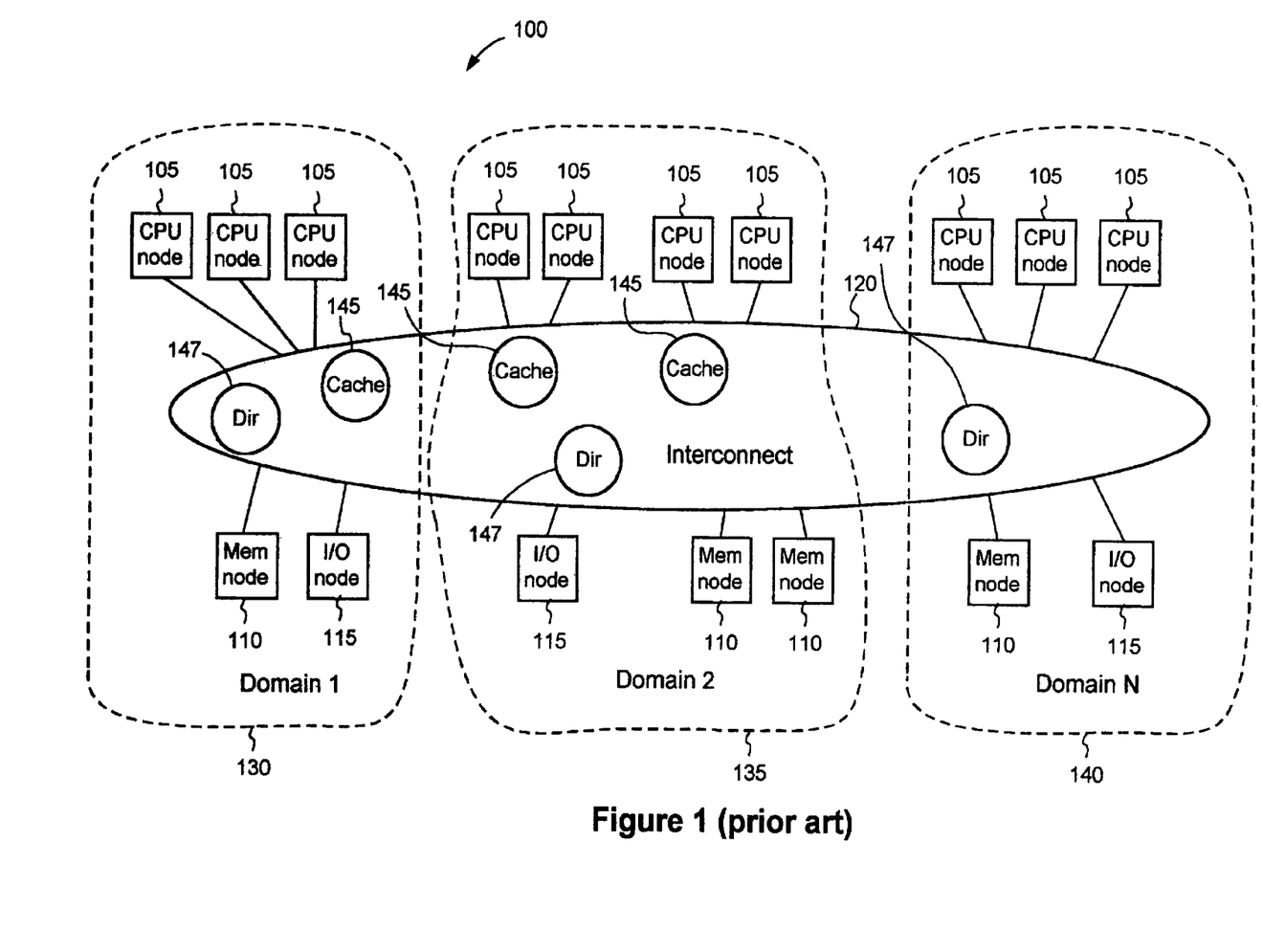

FIG. 1 shows an illustration of a multimode computer system including central processing unit (CPU) nodes 105, memory nodes 110, and input/output (I/O) nodes 115 coupled to a system interconnect 120. Partition definition registers (not shown in FIG. 1), may be used to partition the multimode system into domains 130, 135, 140.

Figure 2A:
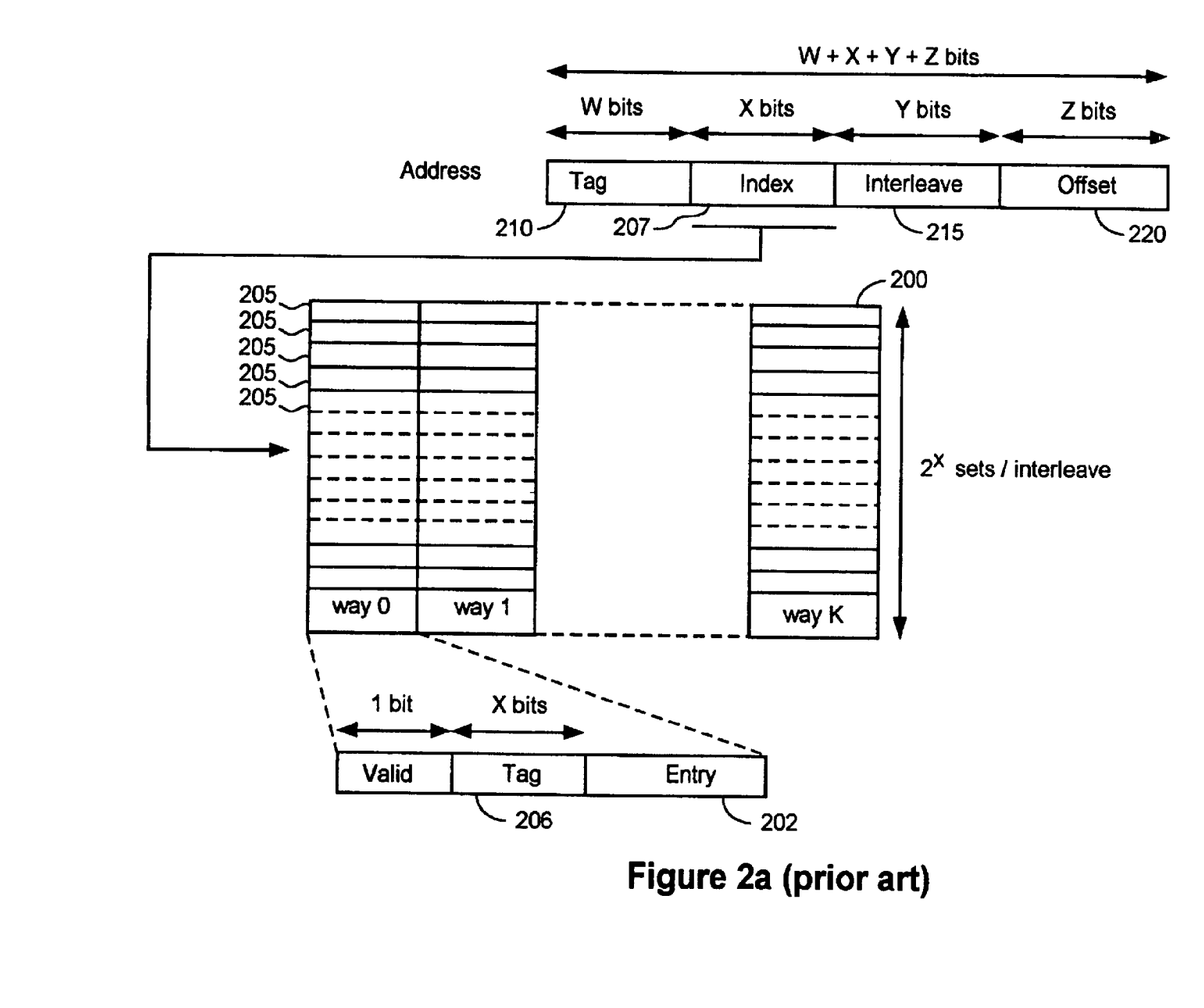
FIG. 2A is an illustrative diagram of a prior art memory structure.
Figure 2B:
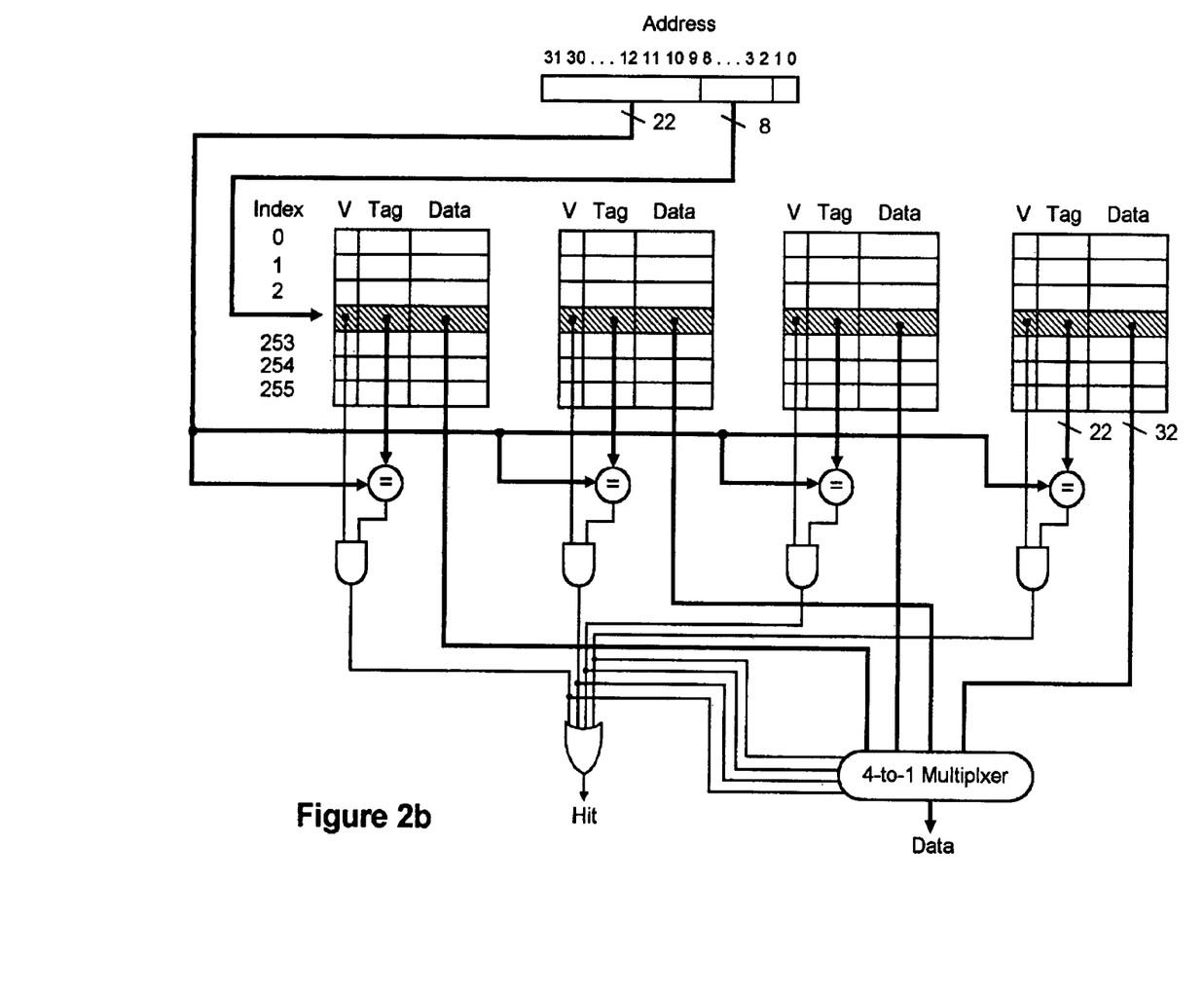
FIG. 2B illustrates a conventional K-way set associative cache memory.

Conventionally, each domain has its own memory structures. This can be implemented as one or more local cache memories 145 which are kept coherent via a sparse directory 147 for each domain. FIG. 2A illustrates a conventional addressing technique for addressing a memory structure within a domain. A cache memory 200 is a data array for storing sets 205 of data. Each set 205 is also sometimes described in the art as a data line. In a traditional cache memory structure, each cache line entry 202 stored in the cache typically has an associated tag field 206. The value of the index 207 of the address indicates to which set 205 of the cache the address maps to.

In a K-way set associative cache, each set (cache address) consists of a set of K-lines of data entries, with each data entry in the set having its own tag field 206. When a new word is brought into the cache the tag bits are stored along with the data bits. When a CPU generates a memory request, the index 207 of the memory address is used to select a set 205 in the cache, i.e., a set 205 in the cache is indexed by the portion of the memory address called the index 207. The tag 210 of the CPU memory address is compared with the tag 206 of an entry 202 from the cache. If the tags 206 and 210 match there is a hit and the desired word entry is in the cache. For a K-way set associative cache, each of the K-lines in a set has its own tag and the tags for each entry are compared in parallel with the incoming address with a hit occurring if one of the tags match. Interleaving may be included so that multiple independent requests may be processed. Consequently, an interleave field 215 identifies which leaf to use. An offset field 220 identifies which data structure with the cache line is being accessed. FIG. 2B illustrates a conventional hardware system having comparators and multiplexors to output a signal indicative of a hit if the tag portion of the address matches the tag of an entry that is being addressed.

It will be understood that FIG. 2A represents a generalized addressing system that includes a variety of special memory structures. For example, the cache memory does not have to be interleaved (Y=0). If the cache memory structure does not use tags (W=0), the cache acts like a random access memory (RAM) in that every access is a hit. Moreover, if the cache memory structure does not have an index (X=0) it acts as a fully associative memory or a Content Addressible Memory (CAM).

A drawback of computer system 100 is that changes in domain partitioning and usage patterns may result in inefficient use of the memory hardware. Referring again to FIG. 1, in a typical computer system the domain partitioning of the system may change over time to meet new needs, i.e., the computer system may be configured to change the number of domains to meet new needs. However, since each domain requires at least one cache memory structure the total number of cache memories must be selected to be at least equal to a maximum number of domains for which computer system 100 is designed to support. If the number of domains is less than the maximum value there will be one or more idle memories. This is inefficient in regards to the use of cache memory hardware.

Therefore, there is a need for a system and method of improving the allocation of memory structures in partitioned computer systems.

SUMMARY OF THE INVENTION

A system and method of logically partitioning a cache memory between computer domains using an extended memory address is disclosed. The extended memory address includes an address space identifier for extending a conventional memory address with at least one bit uniquely identifying the address space of a domain from which a data request is made to the cache memory. In one embodiment the address space identifier has tag extension bits and index extension bits that are used to extend the tag bits and index bits of a conventional memory address. In this embodiment, a data set in the cache memory is accessed by an index value that includes the index bits and the index extension bits and a hit is determined from a tag value that includes the tag bits and the tag extension bits.

BRIEF DESCRIPTION OF THE DRAWINGS

FIG. ("FIG.") 1 is a block diagram of one embodiment of an overall architecture of a prior art multi-node network computer system.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

Figure 3:
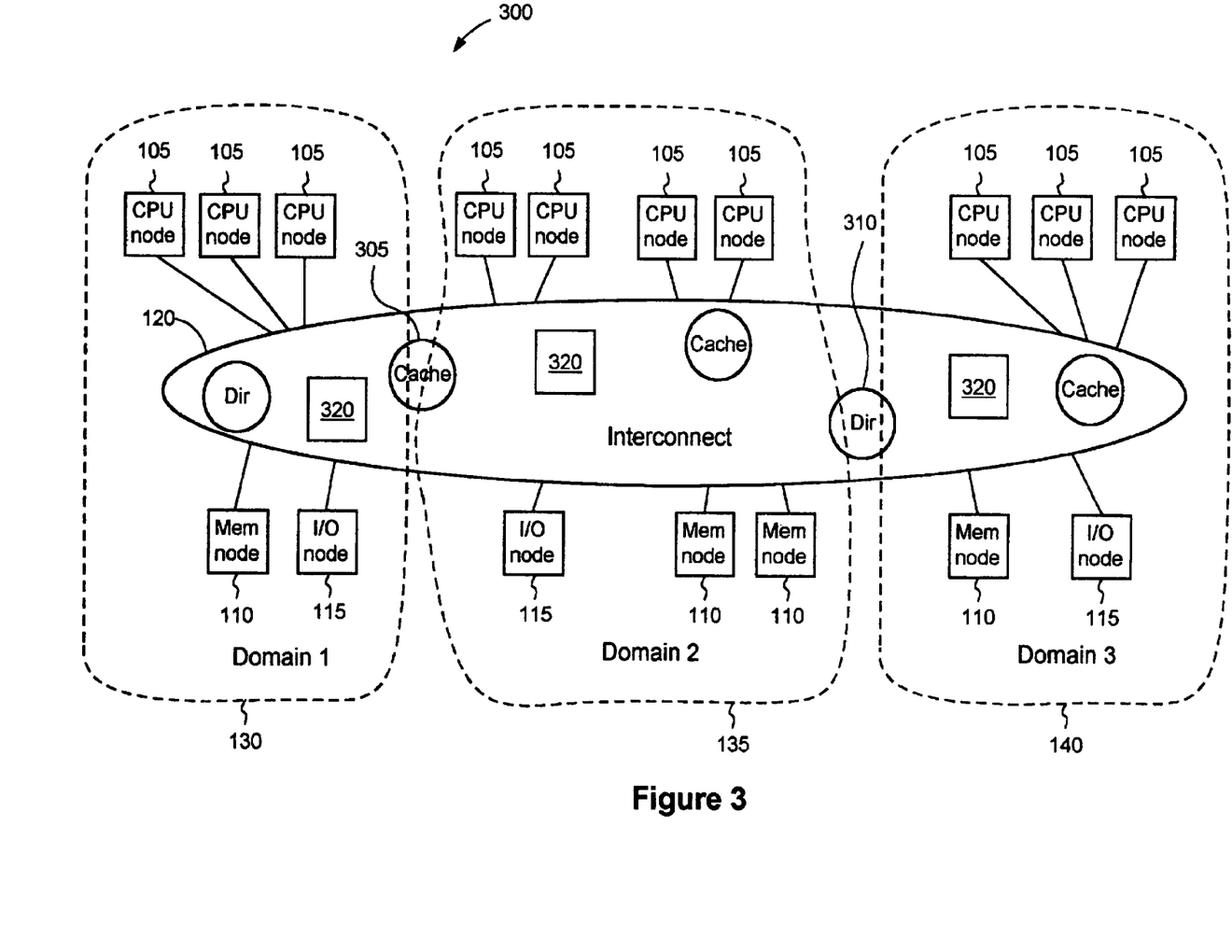
FIG. 3 is multimode computer system in accordance with the present invention in which memory structures are logically partitioned.

The present invention includes a system and a method for a logical partition of a memory structure between computer domains. Referring to FIG. 3, in accordance with the present invention, in one embodiment there is provided a multi-node network system that includes a plurality of central processing unit (CPU) nodes 105, memory nodes 110, and input/output (I/O) nodes 115 coupled to a system interconnect 120. The system interconnect 120 may be, for example, a mesh, ring or hypercube implemented using routers or switches. Partition definition registers (not shown in FIG. 3), may be used to partition the multimode system into domains 130, 135, 140.

One aspect of the present invention is that logical partitioning of shared memory structures, such as cache memory 305 and sparse directory tables 310, between domains is supported. This is illustrated graphically by the boundary between domains passing through a memory structure. The logical partitioning permits the physical memory to be shared while maintaining domain isolation. Moreover, the logical partitioning permits flexible control over how a particular memory structure is partitioned.

Each domain of computer system 300 functions as an independent machine and consequently each machine has its own address space. Each domain has its own address space. Each address space has a set of memory addresses for accessing memory structures within the domain, such as a cache memory. Thus domain 130 has an associated address space, domain 135 has an associated address space, and domain 140 has an associated address space. The same memory address in different domains is not physically equivalent because the request originates from a different address space.

One aspect of the present invention is a method to extend a conventional memory address of a data request originating from a domain to include an additional bit field that references the address space from which the request originates. In accordance with the present invention, each domain 135, 135, and 140 is assigned a unique address space identifier. The unique address space identifier can be any numeric value that is uniquely associated with the address space from which the request originated. As one example, the unique address space identifier can be a unique numeric label assigned to each domain. As another example, in a distributed shared memory multi-node system in which memory is physically distributed across nodes, each node could be assigned a unique global identifier in the system that is used as the address space identifier. Since a domain encompasses a selected subset of the nodes, the unique global identifier of a node would identify the target address space of the request.

In one embodiment, whenever a memory request is made to the address space of a domain in a shared memory structure, the memory address has the bit field of the unique address space identifier attached as an additional bit field, such as a bit field attached as prefix bits.

The unique address space identifier of the extended address includes additional information which permits the data entries of the shared memory structure to be allocated in a variety of different ways between shared domains, as described below in more detail. Generally speaking, bits from the unique address space identifier may be combined with the index bits of the memory address to form an index value for accessing a set in the shared memory structure while bits from the unique address space identifier may be combined with the tag bits to form a tag value for determining a hit.

Figure 4:
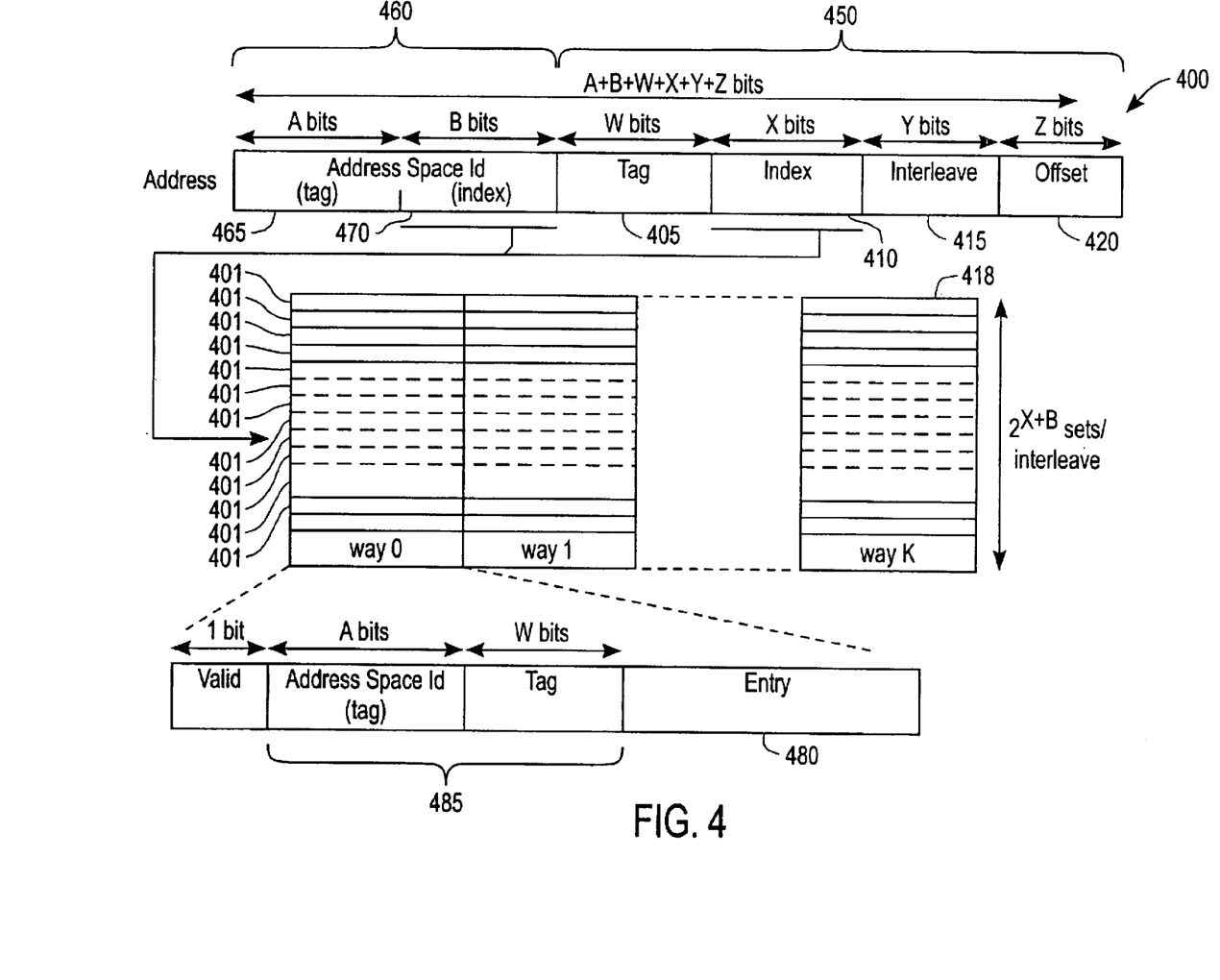
FIG. 4 illustrates a memory array and address format in accordance with the present invention.

FIG. 4 shows one embodiment of an address format 400 in accord with the present invention for accessing a memory structure 418 having a plurality of data sets 401. Memory structure 418 may be a cache or other memory structures in which data sets 401 are accessible by an index value. In one embodiment, the memory structure is a K-way set associative data cache where each set 401 is a set of data entries 480 having K-lines. Address format 400 preferably includes the bits of a conventional domain memory address 450, such as a domain memory address having a tag field 405 for tag bits, an index field 410 for index bits, an interleave field 415 for interleave bits, and an offset field 420 for offset bits. The conventional domain memory address 450 is extended by the bits of a unique address space identifier field 460. In one embodiment, the unique address space identifier 460 field comprises a tag extension field 465, such as a tag extension field with an integer number "A" of bits uses as a tag extension and an index extension field 470 having an integer number "B" of bits used as an index extension.

Referring to FIG. 3, the unique address space identifier 460 field may be added to local domain memory address 450 as prefix bits using a conventional logic circuit 320 adapted to combine the bits of the unique address space identifier 460 with the local domain address 450 as a single word. For example, the unique address space identifier could be recorded in a programmable routing table by a control interface (not shown in FIG. 3). The output of the routing table could then be automatically used as additional bits to cache requests originating form the domain. The routing tables are reprogrammed if the domain partitioning changes. Alternatively, the destination node identifier can be used as the address space identifier.

FIG. 4 illustrates one embodiment in which the bit value of the index used to select a data line in a cache is a combination of the conventional index bits and the index extension bits. In the illustrative example of FIG. 4, if the index 410 is X bits wide and the index extension field 470 is B bits wide, the index value used to select a data set can have a width of B+X bits wide. In one embodiment illustrated in FIG. 4 there are $2^{X+B}$ data sets (data sets in a K-way associative cache) corresponding to an extended address space having an index value with a width of B+X bits. As an illustrative example, if the computer system has a maximum number of domains that is less than or equal to eight, the index extension 460 is three bits wide (i.e., one unique value for each potential domain) in the system. In this embodiment, if A=3 and B=0 two domains in which the local domain index values are identical would access the same data set in the cache.

Each data entry 480 in a set 401 of the cache is stored with a tag value 485 that preferably includes the bits of tag field bits 405 and the bits of tag extension field 465. This permits the effective tag value used to compare a request with a cache entry to include the tag value of the local domain address combined with the tag extension bits of the unique address space identifier. For example, if the tag 405 is W bits wide and the tag extension 465 is A bits wide, the tag value 485 can be A+W bits wide.

The present invention permits a memory structure to be used in a variety of different ways. If the index extension is non-zero, the data set entries are divided up by $2^B$, where B is the number of bits of the index extension 470. As shown in FIG. 4, there can thus be $2^{X+B}$ sets of entries in a K-way associative memory. All domains for which the address space ID has the same index extension value share the same subset of entries. If desired, however, each domain may be assigned a unique index extension value so that no domain shares a subset of entries by setting A to zero.

In one embodiment, the index extension field 470 is set to the same value for all domains sharing the memory structure (e.g., the B bits are set to zero). If the B bits are the same (e.g., zero) for all unique domain space identifiers, then the bit value of index field 410 is used to access a data set 401 but the tag value 485 used for a match is the value of tag field 405 plus the value of tag extension field 465 (i.e., A+W bits). This allows individual data entries in a data set 401 to be freely and dynamically allocated across domains, i.e., a single data set can have entries in the set associated with more than one domain. This has the advantage that the system can dynamically allocate all entries on a demand basis to active domains.

If the bit value of the tag extension extension field 465 (e.g., the the A bits) are set to be the same (e.g., zero) for all domains then only the bit value of the domain tag field 405 (the W bits) is used to determine a hit. For this case, if the bit value of the index extension field 470 of two domains are the same, the two domains can access the same data set in the cache. For example, if the A bits are zero, then two domains may also have the same tag value 485. This permits static allocation of entries across domains without imposing a static partition of interface bandwidth to the shared memory structure. This has the benefit of reducing the performance interaction between domains such as requests from one domain causing eviction of an entry allocated to another domain. This also has the benefit of improving fault isolation and containment such that an error in one domain does not affect another domain.

As another illustrative example, consider a system 300 having a maximum of four domains. For this case, the index extension field 470 need only be two bits long to provide four different values of the index extension. Each domain in such a system could be assigned different index extension encoding. This would result in each domain indexing different sets of the memory structure. However, if two of the domains are assigned the same index extension bits (B=1) two domains may access the same cache set. This may be desirable, in some cases, to dynamically allocate entries between domains. (If the index extension bits are the same for two domains, half of the cache sets would be dynamically allocated between one pair of domains and the other half of the cache sets would be dynamically allocated between the other pair of domains).

Another benefit of the present invention is in regards to a computer system 300 having large capacity cache memory structures. Using the present invention a small number of large capacity cache memory structures may be logically partitioned to allocated cache memory for two or more domains, as described above. Note that in one embodiment that the unique address space identifier of each domain is preferably selectable by a control interface. Thus, the manner in which data is allocated between domains in a shared cache may also be varied by changing the bits of the unique address space identifiers.

Figure 5:
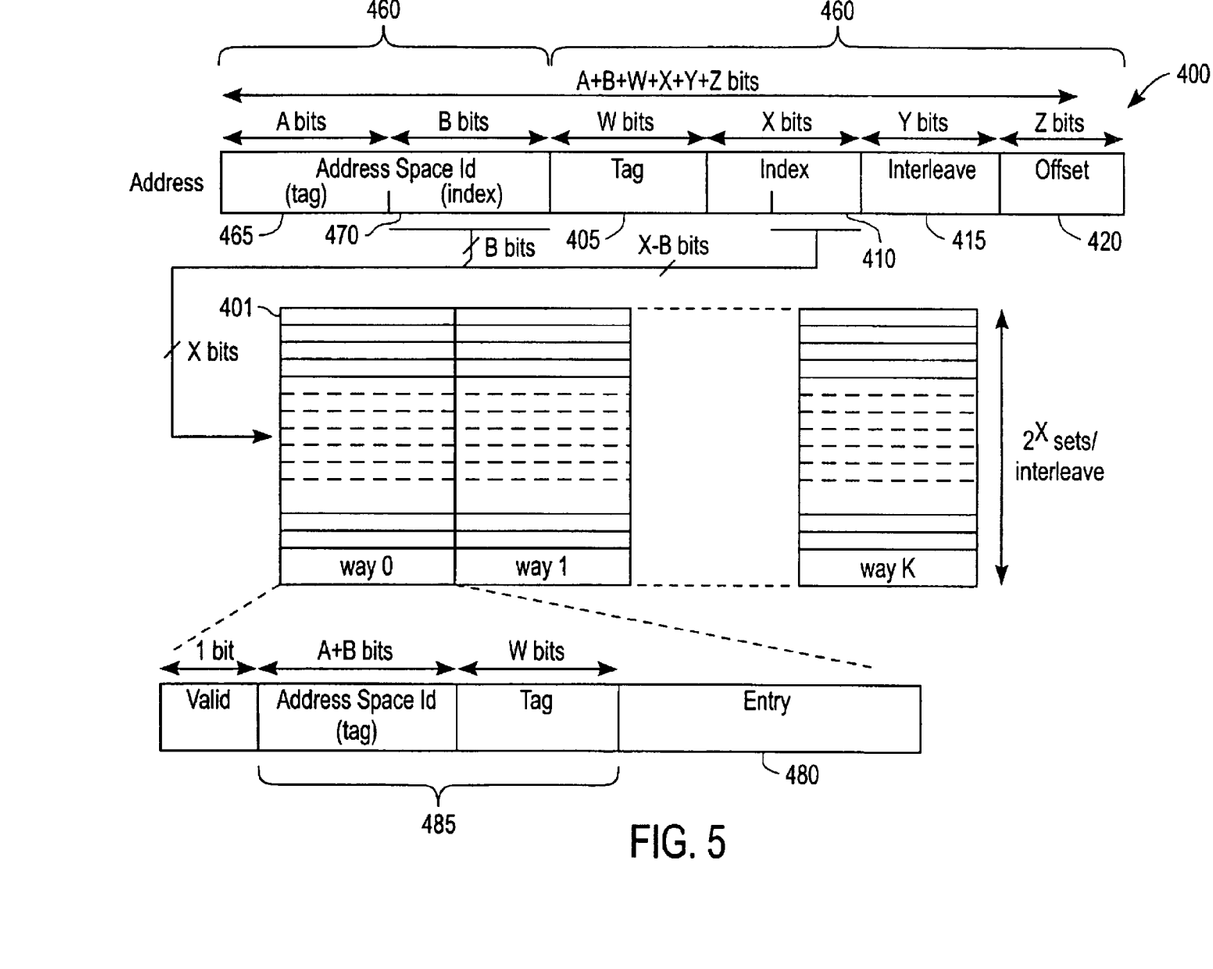
FIG. 5 illustrates an embodiment of the memory array and address format with programmable partitioning.
Figure 6:
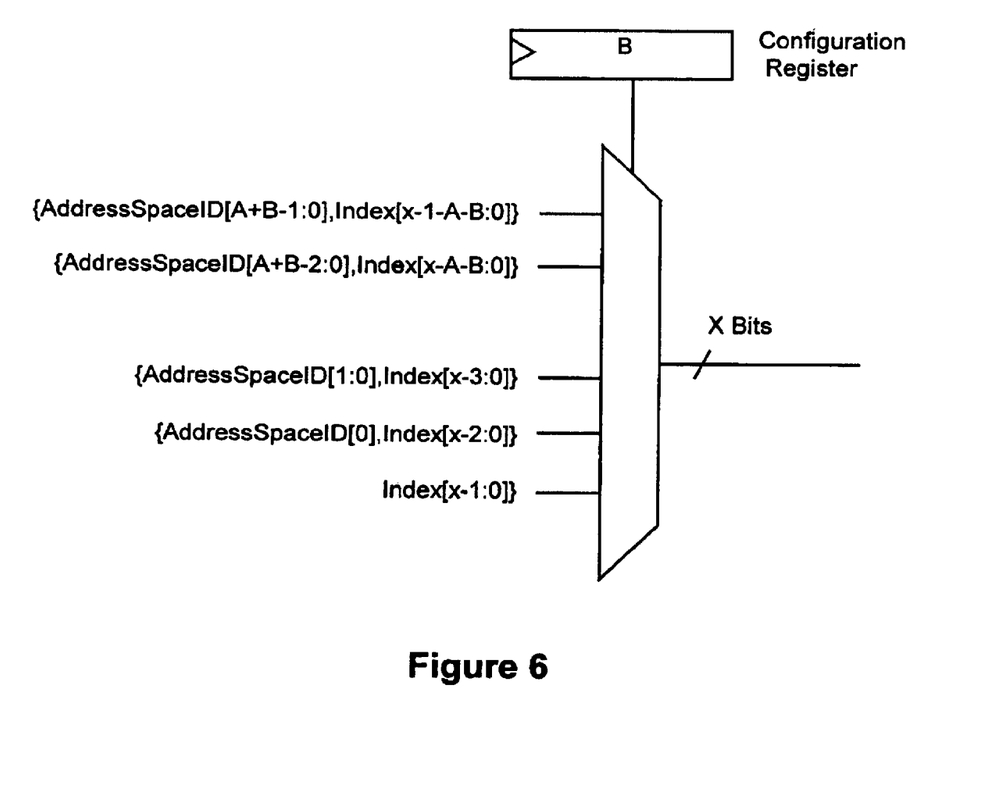
FIG. 6 illustrates a block diagram of a circuit for generating index bits for the programmable partitioning embodiment of FIG. 5.

One embodiment of the present invention is as a single hardware implementation whose configuration is programmable, which supports flexible dynamic partitioning of the server into domains. In this embodiment the full address space identifier 460 (i.e., the A and B bits) can be made part of each tag entry 485 of each set. The partitioning of the cache memory structure then becomes a function of the width of the index extension field 470 (e.g., the "B" bits) of address space identifier 460. For this case, a data set 401 is indexed by the concatenation of the bits (B) of the index extension field 470 and the low (X–B) bits of the index field 410. The choice of configuration is selected by setting the value of the index extension field 470 in a configuration register. FIG. 5 illustrates this embodiment. An individual data set is indexed by the concatenation of the B bits and the X–B bits of the index field 410. FIG. 6 shows a hardware mechanism for generating the index field. The choice of configuration is selected by setting the value of the B bits in a configuration register.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer system, comprising:

a cache memory having a plurality of data sets with each data set having at least one data entry, each data set having an index value for accessing the data set and each data entry having a tag value for determining a hit; and at least two domains sharing the cache memory, each domain having an address space including a plurality of memory addresses with each memory address having a tag field with tag bits and an index field with index bits; each of the domains configured to request data from the cache memory by extending the memory address of the domain from which the request originates with an address space identifier having at least one bit unique to the address space wherein the address space identifier comprises a plurality of index extension bits and a plurality of tag extension bits, the index value for accessing a data set in the cache memory being the index bits of the memory address extended by the index extension bits and the tag value for determining a hit being the tag bits of the memory address extended by the tag extension bits wherein the tag extension bits have a value of zero.

2. A computer system, comprising:

a cache memory having a plurality of data sets with each data set having at least one data entry, each data set having an index value for accessing the data set and each data entry having a tag value for determining a hit; and at least two domains sharing the cache memory, each domain having an address space including a plurality of memory addresses with each memory address having a tag field with tag bits and an index field with index bits: each of the domains configured to request data from the cache memory by extending the memory address of the domain from which the request originates with an address space identifier having at least one bit unique to the address space wherein the address space identifier comprises a plurality of index extension bits and a plurality of tag extension bits, the index value for accessing a data set in the cache memory being the index bits of the memory address extended by the index extension bits and the tag value for determining a hit being the tag bits of the memory address extended by the tag extension bits and wherein at least two address spaces accessing the cache memory have the same value of the index extension bits.

3. The computer system of claim 2, wherein at least two data entries from at least two address spaces have the same tag value.

4. A computer system, comprising:
- a cache memory having a plurality of data sets with each data set having at least one data entry, each data set having an index value for accessing the data set and each data entry having a tag value for determining a hit; and
- at least two domains sharing the cache memory, each domain having an address space including a plurality of memory addresses with each memory address having a tag field with tag bits and an index field with index bits; each of the domains configured to request data from the cache memory by extending the memory address of the domain from which the request originates with an address space identifier having at least one bit unique to the address space
- wherein the address space identifier comprises a plurality of index extension bits and a plurality of tag extension bits, the index value for accessing a data set in the cache memory being the index bits of the memory address and the tag value for determining a hit being the tag bits of the memory address extended by the tag extension bits, the index extension bits and the tag extension bits of the address space identifier.

5. The computer system of claim 4, wherein a bit value of the index bits is used as the index value.

6. A computer system, comprising:
- a plurality of nodes coupled by an interconnect, the nodes partitioned into a plurality of domains, each domain having an address space with each memory address in the address space having a tag with tag bits and an index with index bits;
- a cache memory shared between at least two of the domains, the cache memory including a plurality of data sets with each data set including at least one data entry, each data set having an index value for accessing the data set and each data entry having a tag value for determining a hit; and
- at least one logic circuit configured to extend the memory address of each data request made to the cache memory with an address space identifier having at least one bit unique to the domain from which the request originates, the index value being a first function of the address space identifier and the index of the memory address of the domain, and the tag value being a second function of the unique address space identifier and the tag of the memory address of the domain
- wherein the unique address space identifier comprises index extension bits for extending the bit value of the index and tag extension bit for extending the bit value of the tag wherein the tag extension bits have a value of zero.

7. A computer system, comprising:
- a plurality of nodes coupled by an interconnect, the nodes partitioned into a plurality of domains, each domain having an address space with each memory address in the address space having a tag with tag bits and an index with index bits;
- a cache memory shared between at least two of the domains, the cache memory including a plurality of data sets with each data set including at least one data entry, each data set having an index value for accessing the data set and each data entry having a tag value for determining a hit; and
- at least one logic circuit configured to extend the memory address of each data request made to the cache memory with an address space identifier having at least one bit unique to the domain from which the request originates, the index value being a first function of the address space identifier and the index of the memory address of the domain, and the tag value being a second function of the unique address space identifier and the tag of the memory address of the domain
- wherein the unique address space identifier comprises index extension bits for extending the bit value of the index and tag extension bit for extending the bit value of the tag, and
- wherein at least two address spaces accessing the cache memory have the same value of the index extension bits.

8. A computer system, comprising:
- a plurality of nodes coupled by an interconnect, the nodes partitioned into a plurality of domains, each domain having an address space with each memory address in the address space having a tag with tag bits and an index with index bits;
- a cache memory shared between at least two of the domains, the cache memory including a plurality of data sets with each data set including at least one data entry, each data set having an index value for accessing the data set and each data entry having a tag value for determining a hit; and
- at least one logic circuit configured to extend the memory address of each data request made to the cache memory with an address space identifier having at least one bit unique to the domain from which the request originates, the index value being a first function of the address space identifier and the index of the memory address of the domain, and the tag value being a second function of the unique address space identifier and the tag of the memory address of the domain
- wherein the unique address space identifier comprises index extension bits for extending the bit value of the index and tag extension bit for extending the bit value of the tag, and
- wherein the tag value includes the index extension bits and the tag extension bits of the address space identifier.

9. The computer system of claim 8, wherein a bit value of the index bits is used as the index value.

10. A computer system, comprising:
- a cache memory having a plurality of data sets with each of the plurality of data sets including at least one data entry; and
- a plurality of computer domains in the computer system, each domain having an address space and a unique address space identifier having a plurality of bits,
- each of the domains configured to request data from the cache memory using an extended address format that extends a local memory address by the bits of the unique address space identifier wherein the unique address space identifier comprises index extension bits for extending the bit value of the index and tag extension bit for extending the bit value of the tag wherein the tag extension bits have a value of zero.

11. A computer system, comprising:
- a cache memory having a plurality of data sets with each of the plurality of data sets including at least one data entry; and a plurality of computer domains in the computer system, each domain having an address space and a unique address space identifier having a plurality of bits, each of the domains configured to request data from the cache memory using an extended address format that extends a local memory address by the bits of the unique address space identifier wherein the unique address space identifier comprises index extension bits for extending the bit value of the index and tag extension bit for extending the bit value of the tag and wherein at least two address spaces accessing the cache memory have the same value of the index extension bits.

12. A computer system, comprising:

a cache memory having a plurality of data sets with each of the plurality of data sets including at least one data entry; and a plurality of computer domains in the computer system, each domain having an address space and a unique address space identifier having a plurality of bits, each of the domains configured to request data from the cache memory using an extended address format that extends a local memory address by the bits of the unique address space identifier wherein the unique address space identifier comprises index extension bits for extending the bit value of the index and tag extension bit for extending the bit value of the tag and wherein at least two data entries in the at least two address spaces have the same tag value.

13. In a computer system partitioned into a plurality of domains with each domain having an address space with a plurality of memory addresses, a method of sharing a cache memory between two or more of the domains, the method comprising:

selecting a data request having a memory address that includes index bits and tag bits;

extending the memory address with an address space identifier unique to the domain from which the data request originated to form an extended memory address wherein the address space identifier includes tag extension bits and index extension bits;

accessing a data entry in the cache memory with the extended memory address;

forming an index value having the index bits and the index extension bits;

forming a tag value having the tag bits and the tag extension bits; and selecting the index extension bits of two or more of the domains to be identical.

14. In a computer system partitioned into a plurality of domains with each domain having an address space with a plurality of memory addresses, a method of sharing a cache memory between two or more of the domains, the method comprising:

selecting a data request having a memory address that includes index bits and tag bits;

extending the memory address with an address space identifier unique to the domain from which the data request originated to form an extended memory address wherein the address space identifier includes tag extension bits and index extension bits;

accessing a data entry in the cache memory with the extended memory address;

forming an index value having the index bits and the index extension bits;

forming a tag value having the tag bits and the tag extension bits; and selecting the tag extension bits to be the same for all address spaces accessing the cache memory.

15. In a computer system partitioned into a plurality of domains with each domain having an address space with a plurality of memory addresses, a method of sharing a cache memory between two or more of the domains, the method comprising:

selecting a data request having a memory address that includes index bits and tag bits;

extending the memory address with an address space identifier unique to the domain from which the data request originated to form an extended memory address wherein the address space identifier includes tag extension bits and index extension bits;

accessing a data entry in the cache memory with the extended memory address;

forming an index value having the index bits and the index extension bits;

forming a tag value having the tag bits and the tag extension bits; and selecting the index extension bits to be the same for all domains accessing the cache memory.

16. In a computer system partitioned into a plurality of domains with each domain having an address space with a plurality of memory addresses, a method of sharing a cache memory between two or more of the domains, the method comprising:

selecting a data request having a memory address that includes index bits and tag bits;

extending the memory address with an address space identifier unique to the domain from which the data request originated to form an extended memory address wherein the address space identifier includes tag extension bits and index extension bits;

accessing a data entry in the cache memory with the extended memory address;

forming an index value having the index bits and the index extension bits;

forming a tag value having the tag bits and the tag extension bits; and selecting the index extension bits to be the same for at least two of the domains.

17. The method of claim 16, further comprising: selecting the tag extension bits of at least two data entries of at least two of the domains to be identical.

18. A computer system, partitioned into a plurality of domains with each domain having an address space with a plurality of memory addresses, for sharing a cache memory between two or more of the domains comprising:

means for selecting a data request having a memory address that includes index bits and tag bits;

means for extending the memory address with an address space identifier unique to the domain from which the data request originated to form an extended memory address wherein the address space identifier includes tag extension bits and index extension bits;

means for accessing a data entry in the cache memory with the extended memory address;

means for forming an index value having the index bits and the index extension bits;

means for forming a tag value having the tag bits and the tag extension bits; and means for selecting the index extension bits of two or more of the domains to be identical.

19. The system of claim 18 wherein the memory address is a local domain memory address.

20. A computer system, partitioned into a plurality of domains with each domain having an address space with a plurality of memory addresses, for sharing a cache memory between two or more of the domains comprising:

means for selecting a data request having a memory address that includes index bits and tag bits;

means for extending the memory address with an address space identifier unique to the domain from which the data request originated to form an extended memory address wherein the address space identifier includes tag extension bits and index extension bits;

means for accessing a data entry in the cache memory with the extended memory address;

means for forming an index value having the index bits and the index extension bits;

means for forming a tag value having the tag bits and the tag extension bits; and means for selecting the tag extension bits to be the same for all address spaces accessing the cache memory.

21. The system of claim 20 wherein the memory address is a local domain memory address.

22. A computer system, partitioned into a plurality of domains with each domain having an address space with a plurality of memory addresses, for sharing a cache memory between two or more of the domains comprising:

means for selecting a data request having a memory address that includes index bits and tag bits;

means for extending the memory address with an address space identifier unique to the domain from which the data request originated to form an extended memory address wherein the address space identifier includes tag extension bits and index extension bits;

means for accessing a data entry in the cache memory with the extended memory address;

means for forming an index value having the index bits and the index extension bits;

means for forming a tag value having the tag bits and the tag extension bits; and means for selecting the index extension bits to be the same for all domains accessing the cache memory.

23. The system of claim 22 wherein the memory address is a local domain memory address.

24. A computer system, partitioned into a plurality of domains with each domain having an address space with a plurality of memory addresses, for sharing a cache memory between two or more of the domains comprising:

means for selecting a data request having a memory address that includes index bits and tag bits;

means for extending the memory address with an address space identifier unique to the domain from which the data request originated to form an extended memory address wherein the address space identifier includes tag extension bits and index extension bits;

means for accessing a data entry in the cache memory with the extended memory address;

means for forming an index value having the index bits and the index extension bits;

means for forming a tag value having the tag bits and the tag extension bits; and means for selecting the index extension bits to be the same for at least two of the domains.

25. The system of claim 24 further comprising:

means for selecting the tag extension bits of at least two data entries of at least two of the domains to be identical.

26. The system of claim 24 wherein the memory address is a local domain memory address.

27. The system of claim 25 wherein the memory address is a local domain memory address.

* * * * *